United States Patent [19]

Gerber

[11] 4,435,059
[45] Mar. 6, 1984

[54] CAMERA WITH AUTOMATIC APERTURE SETTING AND PARTIALLY COLOR DELETED VIEWFINDER SELECTION

[76] Inventor: Jeremy Gerber, 7 Frog Rock Rd., Armonk, N.Y. 10504

[21] Appl. No.: 431,053

[22] Filed: Sep. 30, 1982

[51] Int. Cl.$^3$ .................. G03B 7/095; G03B 13/02
[52] U.S. Cl. ............................ 354/453; 354/219; 354/295
[58] Field of Search ............ 354/219, 224, 225, 40, 354/43, 295, 270, 271, 23 D

[56] References Cited

U.S. PATENT DOCUMENTS 2,170,959  8/1939  Bartels et al. .................. 354/270

Primary Examiner—Michael L. Gellner
Attorney, Agent, or Firm—Eliot S. Gerber

[57] ABSTRACT

In a shutter-priority automatic single lens reflex camera the operator views the scene through an eyepiece viewfinder whose optical path is through a variable iris diaphragm and a taking lens. When a depth of field preview button is pushed by the operator, the diaphragm closes down to the aperture (opening) determined to be correct for the selected speed under the ambient light conditions. A system is provided to aid the operator in envisioning a black-and-white picture of a color scene by presenting a partially color deleted view of the scene to the eyepiece viewfinder. The operator pushes a button which pulls a special color filter into the optical path of the viewfinder and simultaneously sends a control signal to the camera central processing unit (CPU). The CPU, upon receiving the control signal, determines the proper diaphragm opening for the scene, compensates for the filter (by stopping up) and permits operation of the diaphragm to close down to the compensated aperture. The operator sees the scene, partially color deleted and at the compensated taking aperture, and envisions the picture in black-and-white and in focus.

6 Claims, 3 Drawing Figures

CAMERA WITH AUTOMATIC APERTURE SETTING AND PARTIALLY COLOR DELETED VIEWFINDER SELECTION

The present invention relates to photographic cameras and more particularly to an automatic shutter-priority camera.

At the present time certain cameras are of the automatic shutter-priority type. In such cameras the operator selects the desired shutter speed, generally by rotating a ring which is coaxial with the taking lens of the camera. The camera will automatically determine the aperture opening which, along with the operator selected shutter speed, will permit the proper amount of light to reach the film in order to produce a satisfactory picture. The camera is responsive to the ASA rating of the film and the operator, generally by operation of a dial, sets the ASA number while originally inserting the film roll into the camera.

In such cameras, particularly those of a single lens reflex type in which the optical path of the eyepiece viewfinder is through the taking lens, the scene presented to the operator in the viewfinder is in the same color as in the scene itself. The color image in the viewfinder is desirable when the picture is also in color, for example, a color slide of a color print. However, the color image in the viewfinder may be undesirable, especially under certain circumstances, when using black-and-white film. For example, certain colors are prominent in psychological color effect and consequently the operator may envision the black-and-white picture incorrectly as to its tonal contrast. As one example, the color red usually stands out in a scene, although its rendition in a black-and-white photograph may not be so prominent.

It has been suggested that one manner in which the photographer may envision a color scene in black-and-white is to take an instant photograph of the scene using black-and-white film. The technique of using an instant photograph system, for example, a Polaroid (TM) camera, with black-and-white film, prior to taking a large format rendition is widely used in fashion photography, so that the photographer may envision the scene before taking a number of large format color renditions. This method of using an instant photograph is, however, both cumbersome and relatively expensive. It requires the use of two cameras, the instant photograph camera for the black-and-white picture, and the second camera to take the desired photograph.

OBJECTIVES AND FEATURES OF THE PRESENT INVENTION

It is an objective of the present invention to provide an additional system in a camera which will provide a partially color-deleted view of the scene to the photographer. Such a partially colored deleted scene is more monocolor that the natural scene and enables the photographer to envision what the picture will look like when taken using black-and-white film.

It is a further objective of the present invention to provide such a system in a camera which will not appreciably add to the electronic or mechanical complexity of the camera and will be relatively low in cost.

It is a further objective of the present invention to provide such a partially colored deletion system for a camera which is operable only under the photographer's selection and which is normally not in operation and so does not interfere with the image presented in the viewfinder or with the camera's ability to take pictures.

It is a further objective of the present invention to provide such a partially colored deletion system which will add an additional option under operator control to the shutter priority type of single lens reflex camera.

It is a feature of the present invention to provide an additional device particularly for use in shutter priority single lens reflex cameras. In such cameras a variable diaphragm, for example, an iris diaphragm, is closed down automatically when the picture is taken, i.e., when the shutter is operated, to present the proper amount of light to the film. Such cameras include photo-responsive means, for example, a set of photocells, which determine the proper taking aperture for the photograph and controls the closing down of the variable diaphragm when the picture is taken. Such cameras also include a taking lens and an eyepiece viewfinder which views the scene by means of an optical path through the taking lens. The scene is reflected to the viewfinder from a mirror which is swung out of the way when the shutter is operated.

The additional system of the present invention provides a partially colored deleted scene which is viewed by the photographer in the camera's eyepiece viewfinder. The partially colored deleted scene preferably uses a color filter to delete a considerable amount of the cyan and yellow portions of the color spectrum by using a combination of cyan and yellow filters. A button or switch, operated by the photographer will, when the photographer wishes to see the partially colored deleted scene, pull the color filter into the optical path of the viewfinder. The color filter is spring-loaded against the force of the button so that it is normally out of the optical path of the viewfinder. The operation of the switch also causes the closure of a set of contacts which sends an electrical signal to the central processing unit (CPU) of the camera. The CPU of the camera will have already received from the photo-responsive cells the signal indicating the taking aperture for the scene, for example, f8. The camera CPU will then automatically predetermine the aperture for use with the partially colored deletion filter, which will be a larger aperture, i.e., a stopped-up aperture, for example f5.6. The CPU will then control the mechanism to set the iris diaphragm at the compensated aperture, in this example, f5.6. The opening of the diaphragm will be at the compensated aperture for viewing the scene through the color filter and the eyepiece viewfinder. The scene will be the same as seen by the photographer when pressing the depth of field preview button, i.e., at the taking aperature, but with certain colors partially deleted. The partial deletion of the colors will present a more monotone view which is somewhat similar to a black-and-white photograph, thereby enabling the photographer to envision the scene in black and white.

BRIEF DESCRIPTION OF THE DRAWINGS

Other objectives and features of the present invention will be apparent from the following detailed description which presents the inventor's presently known best mode of practicing the invention. The following detailed description should be taken in conjunction with the drawings, in which.

DETAILED DESCRIPTION OF THE INVENTION

The present invention will be described in the context of a shutter priority single lens reflex camera, although it will be understood that the present invention may be used in other types of cameras in which the aperture is automatically set by the camera.

Figure 1:
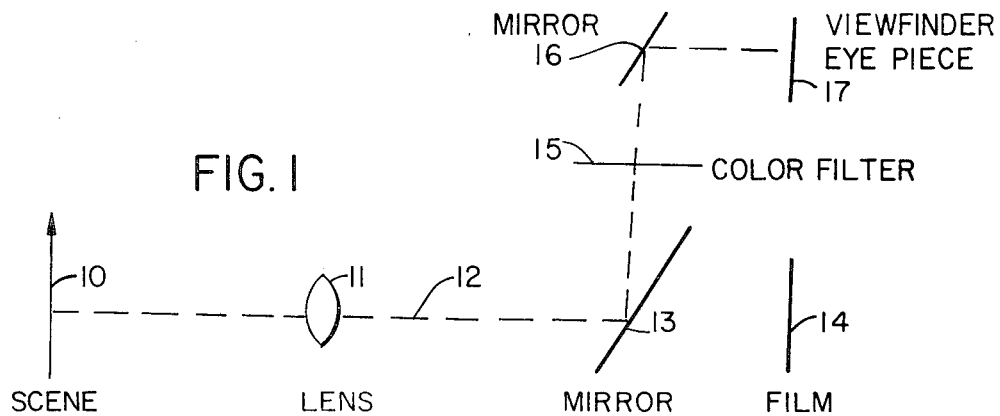
FIG. 1 is a side diagrammatic view of the portions of the invention in the context of a shutter priority single lens reflex camera.
Figure 2:
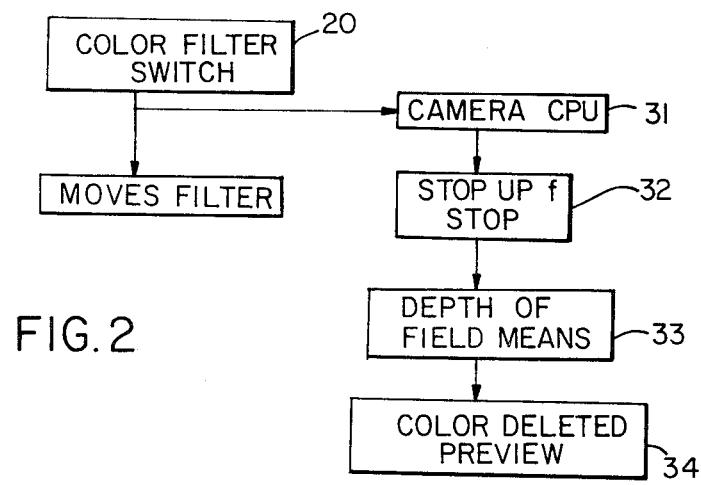
FIG. 2 is a block diagram showing the stages of operation of the system of the present invention.

As shown in FIG. 1, which is an outline of the general concept of the present invention, the scene 10 is viewed by the taking lens 11 of the camera. The optical path 12 is from the taking lens to a mirror 13. The mirror 13 is operated out of the way when the shutter is operated to permit the light from the scene 10 to reach the film 14. When the shutter is not operated, the mirror 13 reflects the light from the lens 11 through the special color filter 15 of the present invention to a second mirror 16. The light from the second mirror 16 is reflected to the viewfinder eyepiece 17.

In normal operation, when the photographer wishes to view the scene in color, he would not operate the color switch 20. The normal position of the color filter 15 is out of the optical path between the viewfinder eyepiece 17 and the lens 11. Consequently, as long as the color filter switch 20 is not operated, the color scene 10 will be seen in color, through the lens 11 by means of the viewfinder eyepiece 17. When the photographer wishes to see a more monotone presentation of he color scene, he will operate the color filter switch 20.

Figure 3:
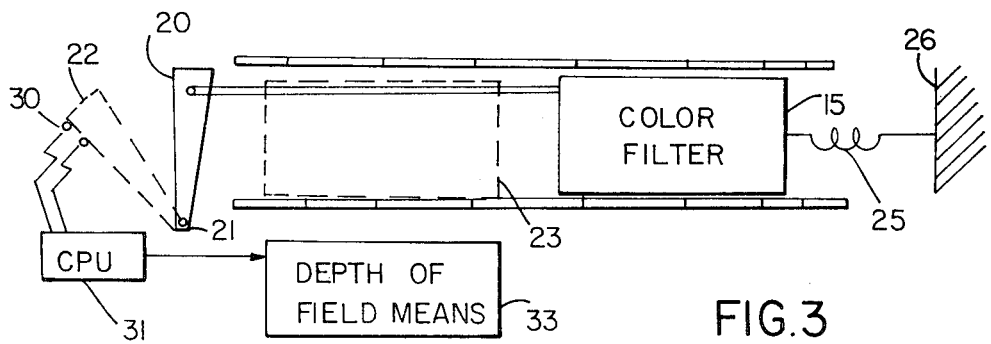
FIG. 3 is a front plan view showing a mechanism that may be used in connection with the present invention.

As shown in FIG. 3, the color filter switch 20 swings about a pivot point and may be moved to its operative position 22 by finger operation. When the color filter switch 20 is operated, it moves the color filter 15 its normal position (out of the optical path to the viewfinder) to its new position 23, in which it is within the optical path to the viewfinder 17. The color filter switch 20 is connected to the color filter 15 by means of the connecting link 24. The color filter 15 is connected through the helical spring 25 to the camera base 26, the spring 25 normally biasing the color filter 15 out of the optical path to the viewfinder 17.

The operation of the color filter switch 20 closes the electrical contacts 30 which are connected to the central processing unti (CPU) 31 of the camera. The camera CPU is able to determine the proper aperture opening for the scene 10 by the amount of light to its photoresponsive means, for example, photocells. The CPU will now provide a new compensated aperture opening which takes into account the original aperture opening (determined for the scene) and the compensation necessary for the color filter. Since the color filter is a fixed filter in the camera, that compensation will be constant. Preferably the filter is chosen so that the copensation is exactly one f-stop up.

Preferably the color filter 15 is a combination of cyan filter factor in the range of 50–100 and yellow filter factor in the range of 50–100. As an example, the filter is 80 cyan filter factor and 80 yellow filter factor, which requires a compensation of one f-stop. The magenta filter factor should be avoided for use in the color filter 15. To add the magenta filter factor has a deleterious effect on the light, i.e., it requires greater compensation. In addition, to add the magenta filter factor to the yellow and cyan would simply result in a neutral density filter.

The camera CPU 31 provides for the compensation 32 required when the color filter 15 is added to the optical path to the viewfinder 17. After such compensation has been determined by the camera CPU the compensated aperture is set in the iris diaphragm and the depth of field preview mechanism 31 is operated. Normally the operation of the depth of field preview mechanism occurs when a separate depth of field preview button is depressed. Such operation of the depth of field preview button by the photographer will close down the iris diaphragm to the aperture which has been selected by the camera CPU for the taking aperture for the scene 10.

The present invention does not replace the depth of field preview button but rather uses the same depth of field preview mechanism which is operated by that button in order to close down the diaphragm to the new conpensated aperture. The closure of the iris diaphragm, by the depth of field preview mechanism 33, will present the color deleted preview 34 to the viewfinder eyepiece 17. The photographer will see a more monotone scene than is normally found in the eyepiece viewfinder. The scene he will see in not a black-and-white scene, since it still has a certain amount of cyan and yellow color and has magenta color. However, the absence of a certain amount of cyan and yellow color from the viewfinder will present an image to the photographer with which he can more easily envision what the final photograph will look like in black-and-white.

What is claimed is:

1. In a camera having a variable diaphragm and a shutter, means to automatically determine the proper taking aperture of said diaphrogm for photographing a scene, means to close down the diaphragm to the determined aperture without operation of the shutter, a taking lens and an eyepiece viewfinder viewing the scene through an optical path through the taking lens and the diaphragm; characterized in having a system to provide a partially color deleted view of the scene through the eyepiece viewfinder, said system including means, selectively under operator control, to position a color filter in the optical path of the viewfinder, means automatically upon said selection to determine the said taking aperature and compensate for said filter, the compensation permitting sufficient light to compensate for said filter, and means to close down said variable diaphragm to said compensated aperture without operating the shutter, to thereby present a partially color-deleted view to said viewfinder.

2. In a camera, as in claim 1, wherein said color filter includes cyan in the range of 50 to 100 filter factor.

3. In a camera, as in claim 1, wherein said color filter also inlcudes yellow in the range of 50 to 100 filter factor.

4. In a camera, as in claim 1, wherein said means to close down to said compensated aperture provides a depth of field preview.

5. In a camera, as in claim 2, wherein said compensation is one f-stop which is stopped up.

6. In a camera, as in claim 1, wherein said means to close down said diaphragm is a depth-of-field preview mechanism and said selective means is a spring-loaded button, which, upon operation, pulls said filter into said viewfinder optical path and operates the depth-of-field preview mechanism.

* * * * *